(12) United States Patent
Fang et al.

(10) Patent No.: US 9,405,904 B1
(45) Date of Patent: Aug. 2, 2016

(54) SYSTEMS AND METHODS FOR PROVIDING SECURITY FOR SYNCHRONIZED FILES

(71) Applicant: Symantec Corporation, Mountain View, CA (US)

(72) Inventors: Ke Fang, Chengdu (CN); Mark Kennedy, Gardena, CA (US); Yanjiao Zuo, Chengdu (CN)

(73) Assignee: Symantec Corporation, Mountain View, CA (US)

( * ) Notice: Subject to any disclaimer, the term of this patent is extended or adjusted under 35 U.S.C. 154(b) by 138 days.

(21) Appl. No.: 14/139,035

(22) Filed: Dec. 23, 2013

(51) Int. Cl.
*G06F 21/56* (2013.01)

(52) U.S. Cl.
CPC ...................... *G06F 21/56* (2013.01)

(58) Field of Classification Search
CPC ........................................................ G06F 21/56
USPC .......................................................... 726/22
See application file for complete search history.

(56) References Cited

U.S. PATENT DOCUMENTS

| | | | | |
|---|---|---|---|---|
| 7,580,699 B1* | 8/2009 | Shaw | ................... | G06Q 20/102 455/410 |
| 8,447,801 B1* | 5/2013 | Roche et al. | ................... | 709/201 |
| 8,510,843 B2* | 8/2013 | Mahaffey | .............. | G06F 21/577 713/188 |
| 8,522,313 B2* | 8/2013 | Haff et al. | .......................... | 726/3 |
| 8,561,142 B1* | 10/2013 | Sobel | ...................... | G06F 21/00 709/203 |
| 8,892,766 B1* | 11/2014 | Wei | ..................... | H04L 67/2814 706/22 |
| 9,060,025 B2* | 6/2015 | Xu | | |
| 2005/0076084 A1* | 4/2005 | Loughmiller et al. | ........ | 709/206 |
| 2006/0115108 A1 | 6/2006 | Rodriguez et al. | | |
| 2008/0005784 A1 | 1/2008 | Miliefsky | | |
| 2008/0091763 A1* | 4/2008 | Devonshire | ............. | G06F 9/548 709/201 |
| 2008/0141379 A1 | 6/2008 | Schmelzer | | |
| 2009/0019141 A1 | 1/2009 | Bush et al. | | |
| 2010/0115254 A1* | 5/2010 | Deng et al. | ........................ | 713/1 |
| 2010/0115614 A1* | 5/2010 | Barile et al. | ..................... | 726/22 |
| 2011/0047597 A1* | 2/2011 | Mahaffey et al. | .................. | 726/3 |
| 2011/0184998 A1* | 7/2011 | Palahnuk et al. | ............. | 707/827 |
| 2011/0208616 A1* | 8/2011 | Gorman et al. | .............. | 705/27.1 |
| 2011/0213830 A1* | 9/2011 | Lopez et al. | ................... | 709/203 |
| 2011/0302630 A1* | 12/2011 | Nair et al. | .......................... | 726/4 |

(Continued)

FOREIGN PATENT DOCUMENTS

GB         2504402 A   *   1/2014

OTHER PUBLICATIONS

Alfred C. Hartmann; Systems and Methods for Creating and Synchronizing Security Metadata Within Synchronized-Data Networks; U.S. Appl. No. 12/241,308, filed Sep. 30, 2008.

(Continued)

*Primary Examiner* — O. C. Vostal
(74) *Attorney, Agent, or Firm* — ALG Intellectual Property, LLC

(57) ABSTRACT

A computer-implemented method for providing security for synchronized files may include (1) synchronizing, using a cloud folder synchronization service, a backend server with both a client folder on a client machine and an additional client folder on an additional client machine, (2) propagating a file from the client folder to the backend server through the cloud folder synchronization service, (3) identifying, using the cloud folder synchronization service, a result of a security scan of the propagated file, and (4) adjusting, using the cloud folder synchronization service, the synchronization of the file with the additional client folder based on the result of the security scan. Various other methods, systems, and computer-readable media are also disclosed.

20 Claims, 7 Drawing Sheets

(56) References Cited

U.S. PATENT DOCUMENTS

| | | | |
|---|---|---|---|
| 2011/0307452 A1* | 12/2011 | Fly | G06F 21/577 707/687 |
| 2011/0320416 A1* | 12/2011 | Kapoor | G06F 17/30578 707/692 |
| 2012/0079004 A1* | 3/2012 | Herman | G06F 17/30516 709/203 |
| 2012/0079095 A1* | 3/2012 | Evans et al. | 709/224 |
| 2012/0110667 A1* | 5/2012 | Zubrilin | G06F 21/56 726/24 |
| 2012/0124433 A1* | 5/2012 | Policke | G01R 31/318558 714/724 |
| 2012/0158725 A1* | 6/2012 | Molloy | G06F 17/30563 707/737 |
| 2012/0173655 A1* | 7/2012 | McEntee | H04L 67/1097 709/216 |
| 2012/0185925 A1* | 7/2012 | Barkie et al. | 726/7 |
| 2012/0240229 A1* | 9/2012 | Sobel et al. | 726/24 |
| 2012/0240236 A1* | 9/2012 | Wyatt | G06F 21/564 726/25 |
| 2012/0255012 A1* | 10/2012 | Sallam | 726/24 |
| 2013/0007848 A1* | 1/2013 | Chaskar et al. | 726/4 |
| 2013/0041931 A1* | 2/2013 | Brand | 709/203 |
| 2013/0117849 A1* | 5/2013 | Golshan | G06F 21/53 726/23 |
| 2013/0138504 A1* | 5/2013 | Bookstaff | G06Q 30/0251 705/14.49 |
| 2013/0138619 A1* | 5/2013 | Krislov | G06F 17/3061 707/695 |
| 2013/0179119 A1* | 7/2013 | Coddington | G01C 3/08 702/159 |
| 2013/0191542 A1* | 7/2013 | Matczynski | G06F 9/5072 709/226 |
| 2013/0212112 A1* | 8/2013 | Blom et al. | 707/741 |
| 2013/0262862 A1* | 10/2013 | Hartley | 713/165 |
| 2013/0268491 A1* | 10/2013 | Chung et al. | 707/634 |
| 2013/0268999 A1* | 10/2013 | Kiang et al. | 726/4 |
| 2014/0006350 A1* | 1/2014 | Fukui | G06F 17/30377 707/632 |
| 2014/0006354 A1* | 1/2014 | Parkison et al. | 707/649 |
| 2014/0013434 A1* | 1/2014 | Ranum | H04L 63/145 726/24 |
| 2014/0019755 A1* | 1/2014 | Gerstner | G06F 12/1408 713/165 |
| 2014/0026182 A1* | 1/2014 | Pearl et al. | 726/1 |
| 2014/0053266 A1* | 2/2014 | Wang | G06F 21/50 726/22 |
| 2014/0075130 A1* | 3/2014 | Bansal et al. | 711/153 |
| 2014/0082749 A1* | 3/2014 | Holland | G06F 21/645 726/29 |
| 2014/0173729 A1* | 6/2014 | Cappos | H04L 63/168 726/22 |
| 2014/0181159 A1* | 6/2014 | Balakrishnan | 707/821 |
| 2014/0188790 A1* | 7/2014 | Hunter | 707/610 |
| 2014/0195516 A1* | 7/2014 | Balakrishnan et al. | 707/722 |
| 2014/0223507 A1* | 8/2014 | Xu | H04L 63/0272 726/1 |
| 2014/0282836 A1* | 9/2014 | Cai | H04L 63/105 726/1 |
| 2014/0282938 A1* | 9/2014 | Moisa | 726/6 |
| 2014/0304618 A1* | 10/2014 | Carriero et al. | 715/753 |
| 2014/0337491 A1* | 11/2014 | Barreto et al. | 709/221 |
| 2014/0359085 A1* | 12/2014 | Chen | 709/220 |
| 2014/0373125 A1* | 12/2014 | Huang | H04L 67/04 726/8 |
| 2015/0007269 A1* | 1/2015 | Brugger et al. | 726/4 |
| 2015/0012488 A1* | 1/2015 | van Rossum | 707/611 |
| 2015/0012616 A1* | 1/2015 | Pearl et al. | 709/219 |
| 2015/0012861 A1* | 1/2015 | Loginov | 715/770 |
| 2015/0067805 A1* | 3/2015 | Martin | H04W 12/06 726/7 |
| 2015/0121449 A1* | 4/2015 | Cp | H04L 63/145 726/1 |
| 2015/0135097 A1* | 5/2015 | Carriero et al. | 715/753 |

OTHER PUBLICATIONS

"Google Drive", https://drive.google.com/#my-drive, as accessed Nov. 12, 2013, (Publication Date Unknown).

"File synchronization", http://en.wikipedia.org/wiki/File_synchronization, as accessed Nov. 12, 2013, Wikipedia, (Sep. 13, 2006).

"Dropbox", https://www.dropbox.com/, as accessed Nov. 12, 2013, (Dec. 26, 1996).

"Microsoft OneDrive", https://onedrive.live.com/about/en-us/, as accessed Nov. 12, 2013, (formerly Microsoft SkyDrive), (On or before Nov. 12, 2013).

"Bitcasa", https://www.bitcasa.com/, as accessed Nov. 12, 2013, (Jun. 14, 2011).

"Amazon Cloud Drive", https://www.amazon.com/clouddrive/home?ref_=cd_auth_home, as accessed Nov. 12, 2013, (On or before Nov. 12, 2013).

* cited by examiner

SYSTEMS AND METHODS FOR PROVIDING SECURITY FOR SYNCHRONIZED FILES

BACKGROUND

Individuals and organizations often attempt to protect their data from malware and other security threats by employing antivirus or other forms of security software designed to identify and neutralize such threats. Security software may reside on a client device and/or on a server that provides protection for one or more client devices.

Similarly, persons and organizations often desire to synchronize files and data between one or more devices. For example, an office executive may have a smartphone, a personal laptop, a personal tablet, and a business workstation. In some cases, the office executive may desire to synchronize the same files and/or folders among one or more of these various devices. To do so, the executive may use a cloud folder synchronization service that automatically or otherwise enables the office executive to continuously and/or discretely synchronize one or more designated files or folders.

Unfortunately, although client devices and/or folders may synchronize files and data, they might not also share results of security scans performed on that data. Moreover, cloud folder synchronization services may not integrate the sharing and/or results of such security scans with the synchronization of the files and data themselves. As a result, backend servers and other client machines may perform security scans that are redundant to previous scans performed by other machines. Similarly, cloud folder synchronization services may automatically synchronize files and data detected to be unsafe or unknown at one device with other devices without taking remedial action, such as blocking and/or repairing the file. The instant disclosure identifies a need, therefore, for improved methods for providing security for synchronized files.

SUMMARY

As will be described in greater detail below, the instant disclosure generally relates to systems and methods for providing security for synchronized files by leveraging the results of a backend security scan during the synchronization process. In one example, a computer-implemented method for accomplishing such a task may include (1) synchronizing, using a cloud folder synchronization service, a backend server with both a client folder on a client machine and an additional client folder on an additional client machine, (2) propagating a file from the client folder to the backend server through the cloud folder synchronization service, (3) identifying, using the cloud folder synchronization service, a result of a security scan of the propagated file, and (4) adjusting, using the cloud folder synchronization service, the synchronization of the file with the additional client folder based on the result of the security scan.

In some examples, adjusting the synchronization of the file with the additional client folder based on the result of the security scan may include signaling to the additional client machine that the file being synchronized is a known good file. Moreover, signaling to the additional client machine that the file being synchronized is a known good file may include signaling to the additional client machine to skip an evaluation of the known good file.

In some embodiments, adjusting the synchronization of the file with the additional client folder based on the result of the security scan may include obstructing access from the additional client machine to the file. Moreover, obstructing access from the additional client machine to the file may include displaying a warning about the result of the security scan at the additional client machine.

Additionally, obstructing access from the additional client machine to the file may include preventing synchronization of the file by blocking access to the file at the additional client machine. Similarly, obstructing access from the additional client machine to the file may include delaying synchronization of the file by requiring user approval prior to synchronizing the file with the additional client machine.

The cloud folder synchronization service may attempt to synchronize any file dropped in a client folder with another client folder corresponding to the same user account. Moreover, the cloud folder synchronization service may attempt to synchronize any file dropped in a client folder with every other client folder corresponding to the same user account.

Identifying the result of the security scan of the propagated file may include identifying that the file is known safe, known malicious, and/or unknown. Moreover, adjusting the synchronization of the file with the additional client folder based on the result of the security scan may include transmitting an indication of the result of the security scan to the additional client machine.

In one embodiment, a system for implementing the above-described method may include (1) a synchronization module, stored in memory, that synchronizes, using a cloud folder synchronization service, a backend server with both a client folder on a client machine and an additional client folder on an additional client machine, (2) a propagation module, stored in memory, that propagates a file from the client folder to the backend server through the cloud folder synchronization service, (3) an identification module, stored in memory, that identifies, using the cloud folder synchronization service, a result of a security scan of the propagated file, (4) an adjustment module, stored in memory, that adjusts, using the cloud folder synchronization service, the synchronization of the file with the additional client folder based on the result of the security scan, and (5) a physical processor that executes the synchronization module, the propagation module, the identification module, and the adjustment module.

In some examples, the above-described method may be encoded as computer-readable instructions on a non-transitory computer-readable medium. For example, a computer-readable medium may include one or more computer-executable instructions that, when executed by a processor of a computing device, may cause the computing device to (1) synchronize, using a cloud folder synchronization service, a backend server with both a client folder on a client machine and an additional client folder on an additional client machine, (2) propagate a file from the client folder to the backend server through the cloud folder synchronization service, (3) identify, using the cloud folder synchronization service, a result of a security scan of the propagated file, and (4) adjust, using the cloud folder synchronization service, the synchronization of the file with the additional client folder based on the result of the security scan.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
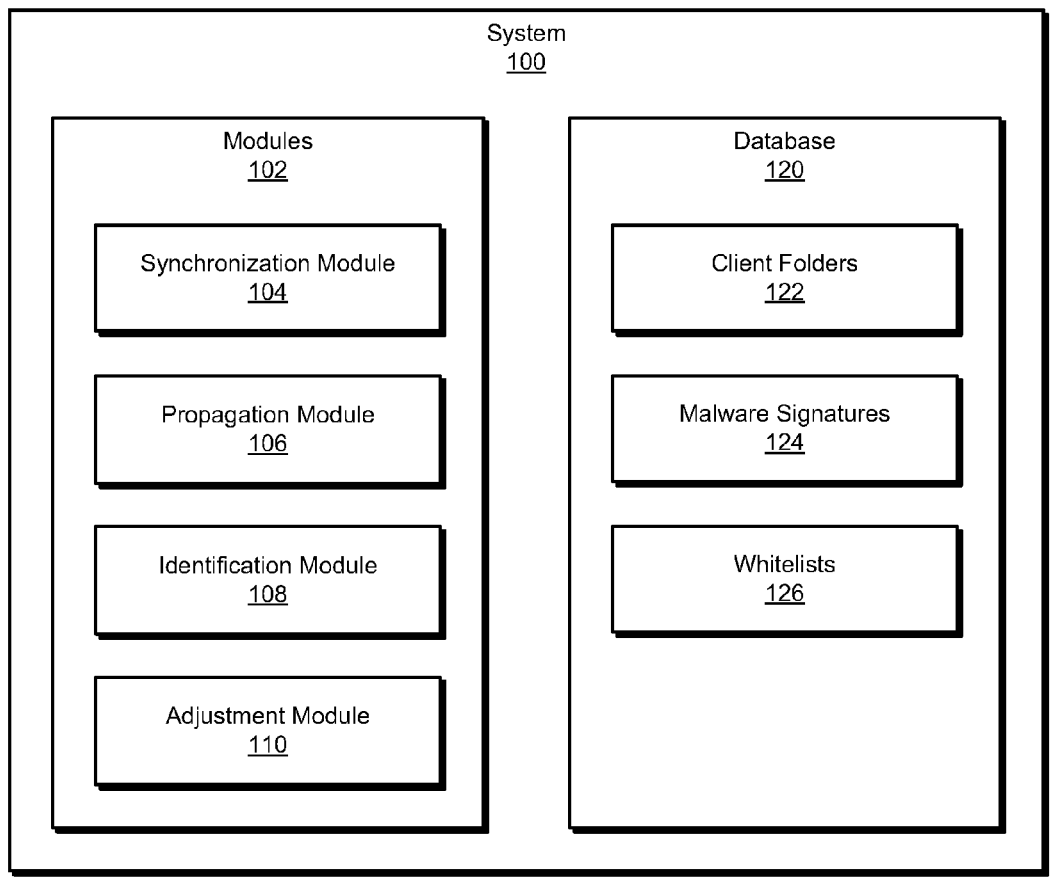
FIG. 1 is a block diagram of an exemplary system for providing security for synchronized files.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for providing security for synchronized files. As will be explained in greater detail below, the systems and methods described herein may eliminate redundant security scans of files and data by sharing the results of a security scan performed at a backend server (or other computing device) within a cloud folder synchronization service. Sharing the results of security scans in this manner may enable receiving client machines to eliminate and/or diminish the need to perform security scans of files with a known degree of safety. This may also enable receiving client machines to avoid synchronizing and/or propagating unsafe or malicious files by diminishing or blocking access to those files and/or repairing those files prior to synchronization and/or propagation.

Figure 2:
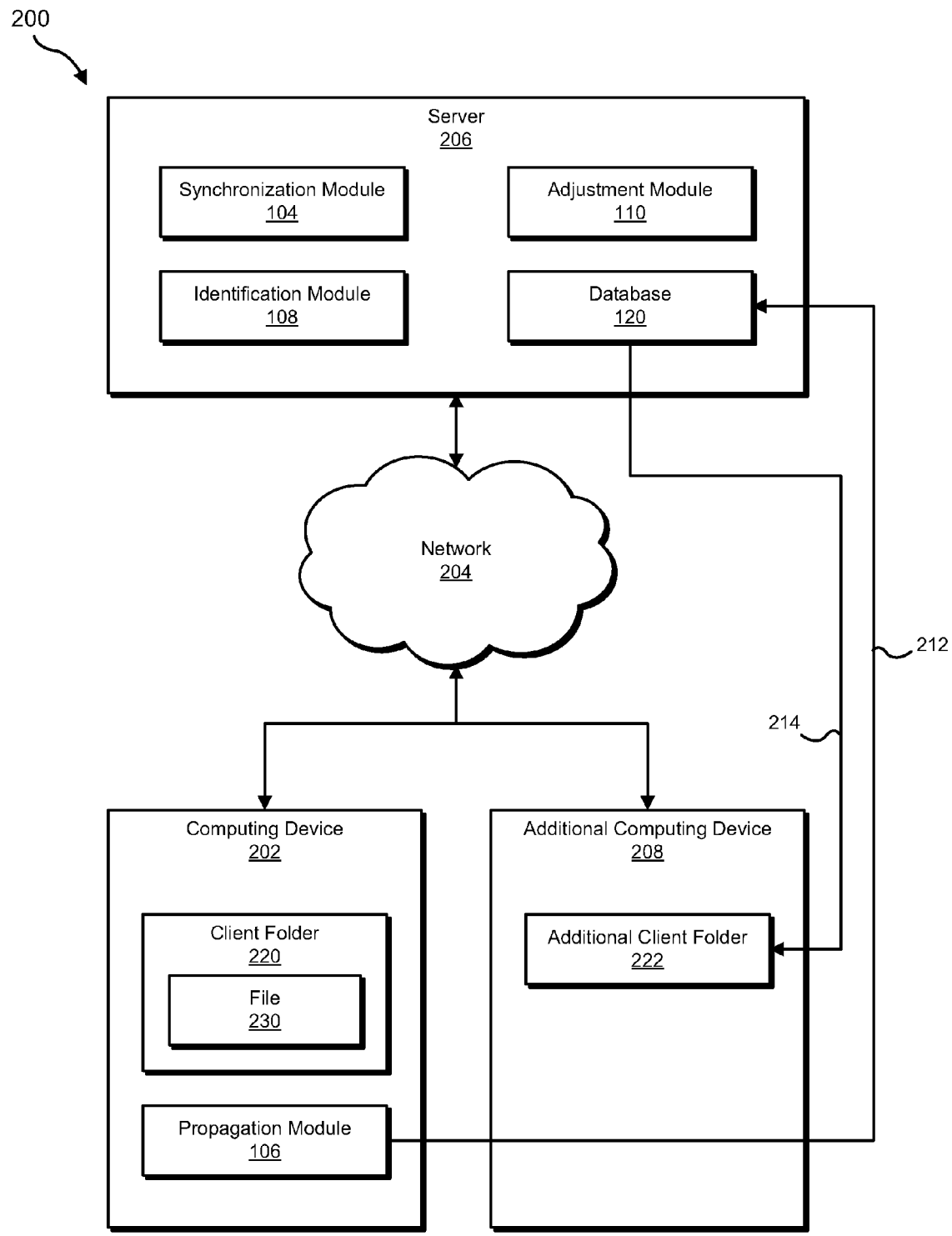
FIG. 2 is a block diagram of an additional exemplary system for providing security for synchronized files.

The following will provide, with reference to FIGS. 1-2, detailed descriptions of exemplary systems for providing security for synchronized files. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for providing security for synchronized files. As illustrated in this figure, exemplary system 100 may include one or more modules 102 for performing one or more tasks. For example, and as will be explained in greater detail below, exemplary system 100 may include a synchronization module 104 that synchronizes, using a cloud folder synchronization service, a backend server with both a client folder on a client machine and an additional client folder on an additional client machine. In this example, the client folder and the additional client folder may both belong to the same user account of the cloud folder synchronization service (or alternatively, belong to different user accounts). Exemplary system 100 may also include a propagation module 106 that propagates a file from the client folder to the backend server through the cloud folder synchronization service.

In addition, and as will be described in greater detail below, exemplary system 100 may include an identification module 108 that identifies, using the cloud folder synchronization service, a result of a security scan of the propagated file. Moreover, exemplary system 100 may include an adjustment module 110 that adjusts, using the cloud folder synchronization service, the synchronization of the file with the additional client folder based on the result of the security scan. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store (e.g., copies of) client folders 122. These folders may correspond to client-side or server-side folders synchronized using a cloud folder synchronization service, as discussed further below. Database 120 may also include malware signatures 124. As detailed below, the systems and methods described herein, including identification module 108, may use malware signatures 124 to identify whether a particular file constitutes malware. Furthermore, database 120 may include whitelists 126, which the systems and methods described herein may use to identify whether a particular file is known to be safe.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as computing device 202 and/or server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In the example of FIG. 2, both computing device 202 and a similar or parallel computing device 208 may correspond to client machines with client folders synchronized together and/or with server 206. As shown in FIG. 2, computing device 202 may include a client folder 220, and computing device 208 may include a synchronized parallel additional client folder 222. Through propagation module 106, computing device 202 may propagate a newly added or newly synchronized file 230 to server 206, which includes database 120. In sequence, server 206 may then adjust synchronization of propagated file 230 with additional client folder 222 based on a result of a security scan, as discussed further below.

In one embodiment, one or more of modules 102 from FIG. 1 may, when executed by a processor of computing device 202 and/or server 206, enable computing device 202 and/or server 206 to provide security for synchronized files. For example, and as will be described in greater detail below, synchronization module 104 may cause computing device 202 and/or server 206 to synchronize, using a cloud folder synchronization service, a backend server, such as server 206, with both a client folder 220 on a client machine, such as computing device 202, and an additional client folder 222 on an additional client machine, such as computing device 208. In this example, client folder 220 and additional client folder 222 may both belong to the same user account of the cloud folder synchronization service. Propagation module 106 may then propagate (e.g., through a propagation operation 212) file 230 from client folder 220 to server 206 through the cloud folder synchronization service. Identification module 108 may then identify, using the cloud folder synchronization service, a result of a security scan of propagated file 230. Finally, adjustment module 110 may adjust (e.g., though an adjustment operation 214), using the cloud folder synchronization service, the synchronization of file 230 with additional client folder 222 based on the result of the security scan.

Computing device 202 (and similarly computing device 208) generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Server 206 generally represents any type or form of computing device that is capable of synchronizing files and/or performing security operations on files. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
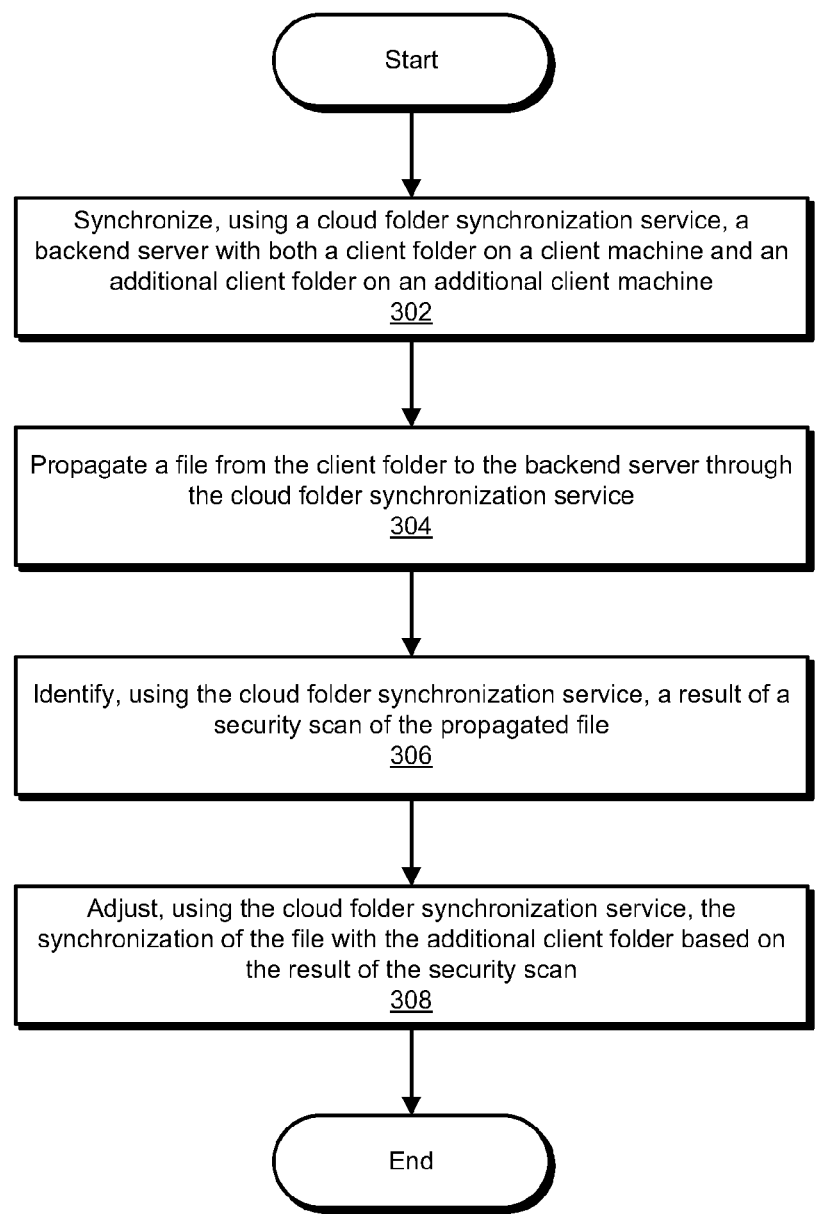
FIG. 3 is a flow diagram of an exemplary method for providing security for synchronized files.

FIG. 3 is a flow diagram of an exemplary computer-implemented method 300 for providing security for synchronized files. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may synchronize, using a cloud folder synchronization service, a backend server with both a client folder on a client machine and an additional client folder on an additional client machine. In this example, the client folder and the additional client folder may both belong to the same user account of the cloud folder synchronization service. For example, synchronization module 104 may, as part of server 206 in FIG. 2, synchronize, using the cloud folder synchronization service, a backend server, such as server 206, with both client folder 220 on computing device 202 and additional client folder 222 on computing device 208. Client folder 220 and additional client folder 222 may both belong to the same user account of the cloud folder synchronization service.

As used herein, the phrase "cloud folder synchronization service" generally refers to any client-server system that synchronizes copies of data between multiple machines, devices, and/or systems. In some examples, the server and/or storage utilized by this cloud folder synchronization service may be cloud-based (e.g., using computational and/or storage hardware that is substantially large, dynamic, virtualized, and/or variable). Similarly, the phrase "synchronize," as used herein, generally refers to a process that maintains copies of data at distinct locations over time with some degree of symmetry, such that changes at one location are automatically propagated (or evaluated for propagation) to another location.

As used herein, the phrase "client machine" generally corresponds to computing device 202 (as further described herein) and/or to any separate client device, physical device, and/or virtual machine. Lastly, the phrase "client folder" generally refers to a storage area, file-directory hierarchy location, physical disk location, virtualized location, static and/or dynamic file location (e.g., following the file), and/or any other suitable location for storing synchronized data. In some examples, a "client folder" may refer to the dynamic and/or relative location of one or more synchronized files (e.g., synchronized as a group and/or assigned to a set by the same tag), each of which may also reside in different conventional storage or file-directory hierarchy locations, and which may be freely moved within a conventional file-directory hierarchy while remaining assigned to the same dynamic client folder (e.g., tag).

Synchronization module 104 may synchronize a backend server with client folder 220 on computing device 202, and with additional client folder 222 on computing device 208, in a variety of ways. In some examples, this synchronization process may be triggered by various events. For example, the cloud folder synchronization service may attempt to synchronize any file dropped in a client folder with one or more other client folders corresponding to the same user account. As used herein, the phrase "dropped" generally refers to moving, copying, and/or placing a file in a client folder, whether by mouse, keyboard, command prompt, or any other input. Similarly, the cloud folder synchronization service may attempt to synchronize any file dropped in a client folder with each other client folder corresponding to the same user account. In some examples, the cloud folder synchronization service may synchronize data upon a user command, according to a predefined or default schedule, and/or in accordance with security and/or data protection policies. Moreover, the cloud folder synchronization service may partially or entirely synchronize all or a designated subset of files within one or both of client folder 220 and additional client folder 222. Furthermore, the cloud folder synchronization service may perform synchronization continuously or at a fixed or predefined schedule.

Figure 4:
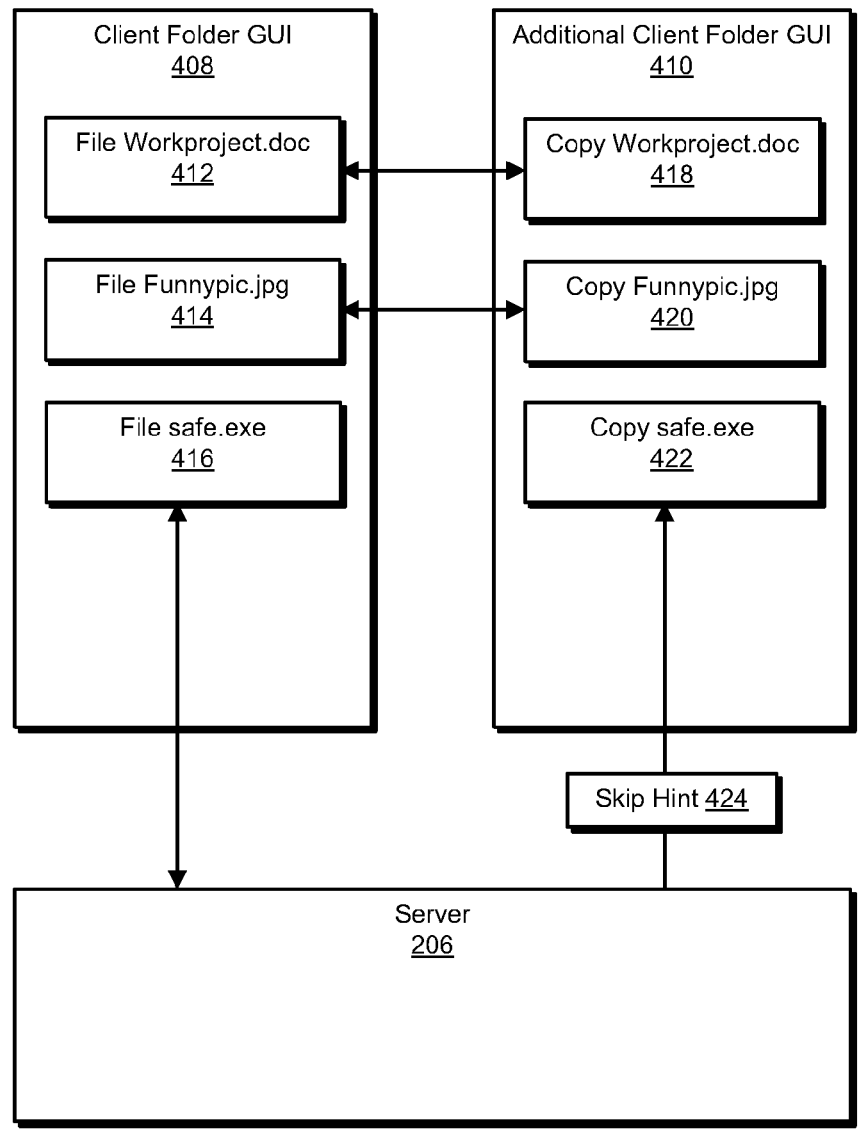
FIG. 4 is a block diagram of exemplary graphical user interfaces for providing security for synchronized files and safe file synchronization.

FIG. 4 shows an exemplary client folder graphical user interface ("GUI") 408, which may correspond to client folder 220. FIG. 4 also shows an exemplary additional client folder GUI 410, which may correspond to additional client folder 222. As shown in FIG. 4, client folder GUI 408 and additional client folder GUI 410 may display the contents of respective synchronized client folders. In this example, client folder 220 contains three files: workproject.doc 412, funnypic.jpg 414, and safe.exe 416. Similarly, additional client folder 222 may contain copies of three files: copy workproject.doc 418, copy funnypic.jpg 420, and (upon synchronization) copy safe.exe 422, each of which corresponds to files in client folder 220.

In this example, the files workproject.doc 412 and funnypic.jpg 414 may correspond to files that the cloud folder synchronization service has already synchronized between client folder 220 and additional client folder 222. Similarly, the cloud folder synchronization service and/or a distinct (e.g., cooperating) security service may have already performed a security scan on both files and validated the files as safe.

In contrast, a user may currently be in the process of dragging and dropping (or otherwise moving) file safe.exe 416 into client folder 220. In this example, file safe.exe 416 may correspond to a safe file that has not yet been evaluated for security purposes. Upon dropping file safe.exe 416 into client folder 220, or in response to any other trigger event, the cloud folder synchronization service may attempt to synchronize and/or perform a security scan on the file, as discussed further below.

Returning to FIG. 3, at step 304 one or more of the systems described herein may propagate a file from the client folder to the backend server through the cloud folder synchronization service. For example, propagation module 106 may, as part of computing device 202 in FIG. 2, propagate file 230 from client folder 220 to server 206 through the cloud folder synchronization service.

As used herein, the phrase "file" generally refers to any set of data that may be synchronized using a cloud folder synchronization service. Examples of such files, include, without limitation, conventional file system files, registry and hardware settings, register and memory contents, and/or file system and directory names, metadata, and/or file paths (or any permutation thereof).

Propagation module 106 may propagate file 230 from client folder 220 to server 206 through the cloud folder synchronization service in a variety of ways. For example, propagation module 106 may propagate file 230 in response to any of the synchronization triggers discussed above. Additionally, or alternatively, propagation module 106 may first perform or require a client-side security scan of file 230. In this example, propagation module 106 may optionally require the security scan to show that file 230 meets a minimum threshold of safety prior to propagating file 230. As used herein, the phrase "security scan" generally refers to any type or form of analysis of a file for the existence of a security threat and/or undesired content, such as worms, trojans, spyware, viruses, vulnerabilities, malware, and/or hidden content, or data relating to one or more of the same, etc.

Returning to FIG. 3, at step 306 one or more of the systems described herein may identify, using the cloud folder synchronization service, a result of a security scan of the propagated file. For example, identification module 108 may, as part of server 206, identify a result of a security scan of propagated file 230 using the cloud folder synchronization server.

Identification module 108 may identify a result of a security scan of propagated file 230 in a variety of ways. For example, identification module 108 may receive a result of a security scan from another device, including a client-side security scan performed at computing device 202, or another sister or synchronized client machine, propagated to server 206 by propagation module 106 and/or provided by a third party vendor or security server. Additionally, or alternatively, identification module 108 may perform or require (e.g., command or request) a server-side and/or additional security scan of file 230.

In some examples, the result of the security scan of the propagated file may indicate that the file is known to be safe, malicious, and/or that the trustworthiness of the file is unknown (i.e., it is unknown whether the file is safe or malicious). Additionally, or alternatively, identification module 108 may assign file 230 a degree of estimated safeness or maliciousness without necessarily categorizing file 230 (e.g., as safe, malicious, and/or unknown, or any other suitable categorization or variation) and/or without comparing file 230 to one or more thresholds. In general, identification module 108 may perform or require a security scan at least in part by checking file 230 against malware signatures 124 and/or whitelists 126 (e.g., names, hashes, and/or identifiers of files known to be safe).

Returning to FIG. 3, at step 308 one or more of the systems described herein may adjust, using the cloud folder synchronization service, the synchronization of the file with the additional client folder based on the result of the security scan. For example, adjustment module 110 may, as part of server 206, adjust the synchronization of file 230 with additional client folder 222 based on the result of the security scan.

Adjustment module 110 may adjust the synchronization of file 230 with additional client folder 222 in a variety of ways. In general, adjustment module 110 may adjust the synchronization of file 230 with additional client folder 222 based on the result of the security scan at least in part (e.g., merely) by transmitting an indication of the result of the security scan to the additional client machine. Moreover, upon reception, the additional client machine may further adjust synchronization by using the received indication in any manner that improves or benefits synchronized file security and/or performance (e.g., by modifying its behavior, synchronization, and/or security scanning based on the received indication). As detailed above, this indication of the result of the security scan may be expressed in a variety of ways, including using a security scan score, a degree of known safety, maliciousness, and/or unknown safety, a degree of repairability, the availability of a repair or countermeasure, whether any measured degree meets one or more corresponding thresholds, a time, type, and/or degree of scanning, and/or any other data or metadata about the security scan or known degree of safety of file 230.

In one example, adjustment module 110 may adjust the synchronization of file 230 with additional client folder 222 based on the result of the security scan at least in part by signaling to the additional client machine that the file being synchronized is a known good file. Moreover, adjustment module 110 may signal to the additional client machine that the file being synchronized is a known good file at least in part by signaling to the additional client machine to skip an evaluation of the known good file. For example, and as illustrated in FIG. 4, server 206 may pass a skip hint 424, or any suitable signal, to additional client folder 222 indicating that file safe- .exe 416 is known to be safe. Upon receiving skip hint 424, the additional client machine may intentionally skip a client-side or other security scan of file 230. Additionally, or alternatively, the additional client machine may diminish the quantity, intensity, and/or threshold of any additional client-side and/or outsourced security scans of file 230 based on an indication (e.g., from server 206) that file 230 possesses a degree of known health or safety and/or a lack of known danger or maliciousness.

In some examples, adjustment module 110 may adjust the synchronization of file 230 with additional client folder 222 based on the result of the security scan at least in part by obstructing access from the additional client machine to the file. For example, adjustment module 110 may obstruct access from the additional client machine to file 230 at least in part by displaying a warning about the result of the security scan at the additional client machine. In additional examples, adjustment module 110 may obstruct access from the additional client machine to file 230 at least in part by preventing synchronization of the file by blocking access to the file at the additional client machine.

Figure 5:
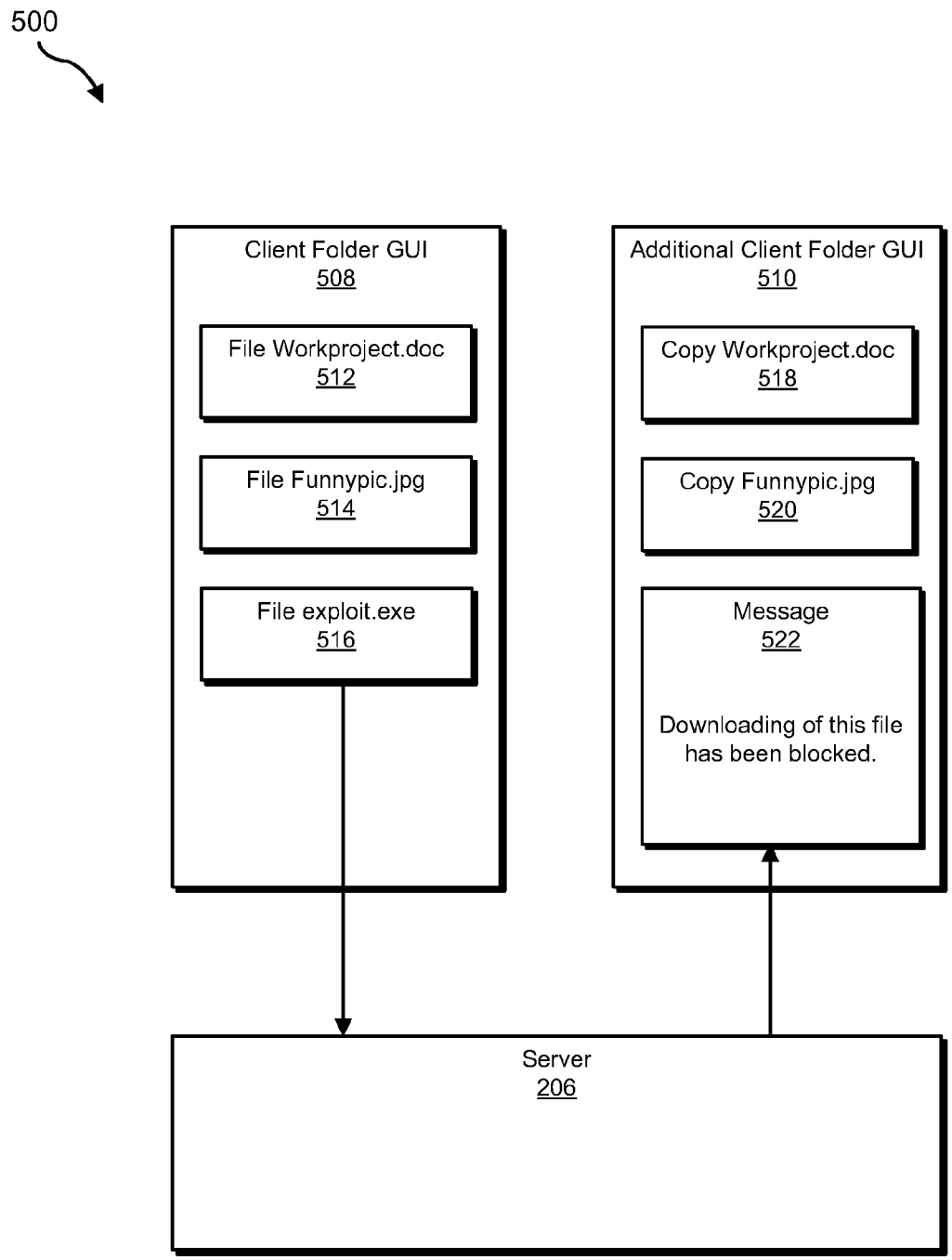
FIG. 5 is a block diagram of exemplary graphical user interfaces for providing security for synchronized files and malware blocking.

FIG. 5 parallels FIG. 4 and shows an exemplary client folder GUI 508 and an exemplary additional client folder GUI 510. In this figure, client folder GUI 508 may contain file workproject.doc 512, file funnypic.jpg 514, and file exploit-.exe 516. File workproject.doc 512 and file funnypic.jpg 514 may correspond to file workproject.doc 412 and file funnypic.jpg 414 in FIG. 4. In contrast, file exploit.exe 516 may correspond to a malicious file or exploit, which has been moved to client folder 220 but not yet tested in a security scan by the cloud folder synchronization service and/or a cooperating service. Similarly, additional client folder 222 may contain copies of the files copy workproject.doc 518 and copy funnypic.jpg 520, which correspond to files in client folder 220.

As shown in FIG. 5, adjustment module 110 may adjust the synchronization of file 230 with additional client folder 222 based on the result of the security scan by blocking access to the file at the additional client machine. In some examples, adjustment module 110 may block access by preventing propagation (e.g., by propagation module 106) of file 230 from the client machine to the backend server, from the backend server to the additional client machine, and/or from one client machine to another (intermediate and/or terminal) client machine. Similarly, adjustment module 110 may block access to file 230 by preventing access at a client machine to a file stored at the same client machine and/or a different client machine or backend server, such as by hiding, encrypting, locking, and/or obscuring file 230, and/or blocking access to a network address, folder, port, and/or file location.

Upon blocking access to file 230, adjustment module 110 may also display a message 522, or an icon, graphic, sound, or other output indication, indicating that access to file 230 has been blocked or diminished, or otherwise inform a user by providing a description (e.g., in plain language, recorded voice, or text) of the adjustment. In some examples, adjustment module 110 may adjust synchronization by simply canceling synchronization and/or removing one, some, and/or all client machines (and/or server 206) from synchronization of file 230, or from synchronization of one, some, or all client folders and/or files (e.g., to stop the spread of unsafe files and/or groups of files).

Adjustment module 110 may similarly obstruct access to file 230 by diminishing access, or placing barriers to access. In one example, adjustment module 110 may obstruct access from the additional client machine to file 230 at least in part by delaying synchronization of file 230 prior to synchronizing file 230 with the additional client machine (e.g., based on an indication that file 230 has a degree of known maliciousness, a degree of unknown safeness, and/or is untrusted). For example, adjustment module 110 may require user or administrator approval prior to synchronization. In general, barriers to access may include user prompts, warnings, password protections, and administrative overrides and approval requirements. Similarly, the barriers to access may include additional (e.g., more in depth) client-side and/or server-side security scans.

Adjustment module 110 may adjust synchronization of file 230 in the same manner, or in different manners, for some and/or all synchronized client folders on the same or different client machines. For example, a server-side adjustment module 110 may establish all criteria for adjustment and adjust synchronization of each file copy in the same manner. Alternatively, one or more client machines and/or folders may have different standards for security and/or protection (e.g., specified and/or stored at the client or at the server for one or more clients), and adjustment module 110 (which may be client-side or server-side) may personalize the adjustment for one or more client machines based on the standards and/or settings assigned to that client machine or folder. For example, a client machine assigned to a supervisor with higher security clearance may establish a higher requirement for safety than another client machine assigned to a lower level employee with a lower level of security clearance. Moreover, one client machine may have software and/or hardware settings, protocols, and/or platforms that have a known degree of vulnerability that differs (e.g., is higher) than for another client machine, thereby receiving a higher standard of security protection during synchronization adjustments. Any one of various client machines may supplement previous server-side and/or client-side security scans with the machine's own client-side or outsourced further security scan to meet the client machine's own assigned standard for security scans and protection, which may differ from other client machines. In some examples, these standards and/or settings may be specified and/or stored by a user, administrator, and/or software (e.g., antivirus and/or security software), including software defaults, at the same client machine or remotely from a server or other client machine. In addition, the standards and/or settings may establish minimum and/or maximum baseline levels of protection for one or more parameters, or overall settings, for individual client machines and/or for specific hardware/software platforms used by one or more client machines. Moreover, client folders may be personalized in each of the same ways as client machines, as discussed above.

In some examples, adjustment module 110 may adjust synchronization at least in part by entirely and/or partially repairing file 230 (e.g., at the client machine, additional client machine, and/or the backend server) upon a determination that file 230 poses a degree of threat and/or upon user request (e.g., upon prompting of the threat). Moreover, adjustment module 110 may adjust synchronization by synchronizing one or more un-repaired files (e.g., at the original client machine) with repaired copies of those files (e.g., autonomously substituting repaired for un-repaired copies). Adjustment module 110 may similarly propagate and/or provide access at the additional client machine to the un-repaired file while also notifying a user and/or security program at the additional client machine and/or providing access to additionally and/or alternatively download, propagate, substitutive, and/or synchronize a repaired copy of the file. In other words, the cloud folder synchronization service may enable a user to optionally download, propagate, and/or synchronize one, both, and/or neither of the un-repaired file and the repaired file (or multiple various repaired or revised versions of a file, including files that have been stripped to various degrees for heightened layers of security at the potential cost of diminished performance, content, and/or functionality).

As described above, the systems and methods described herein may eliminate redundant security scans of files and data by sharing the results of a security scan performed at a backend server (or other computing device) within a cloud folder synchronization service. Sharing the results of security scans in this manner may enable receiving client machines to eliminate and/or diminish the need to perform security scans of files with a known degree of safety. This may also enable receiving client machines to avoid synchronizing and/or propagating unsafe or malicious files by diminishing or blocking access to those files and/or by repairing those files prior to synchronization and/or propagation.

Figure 6:
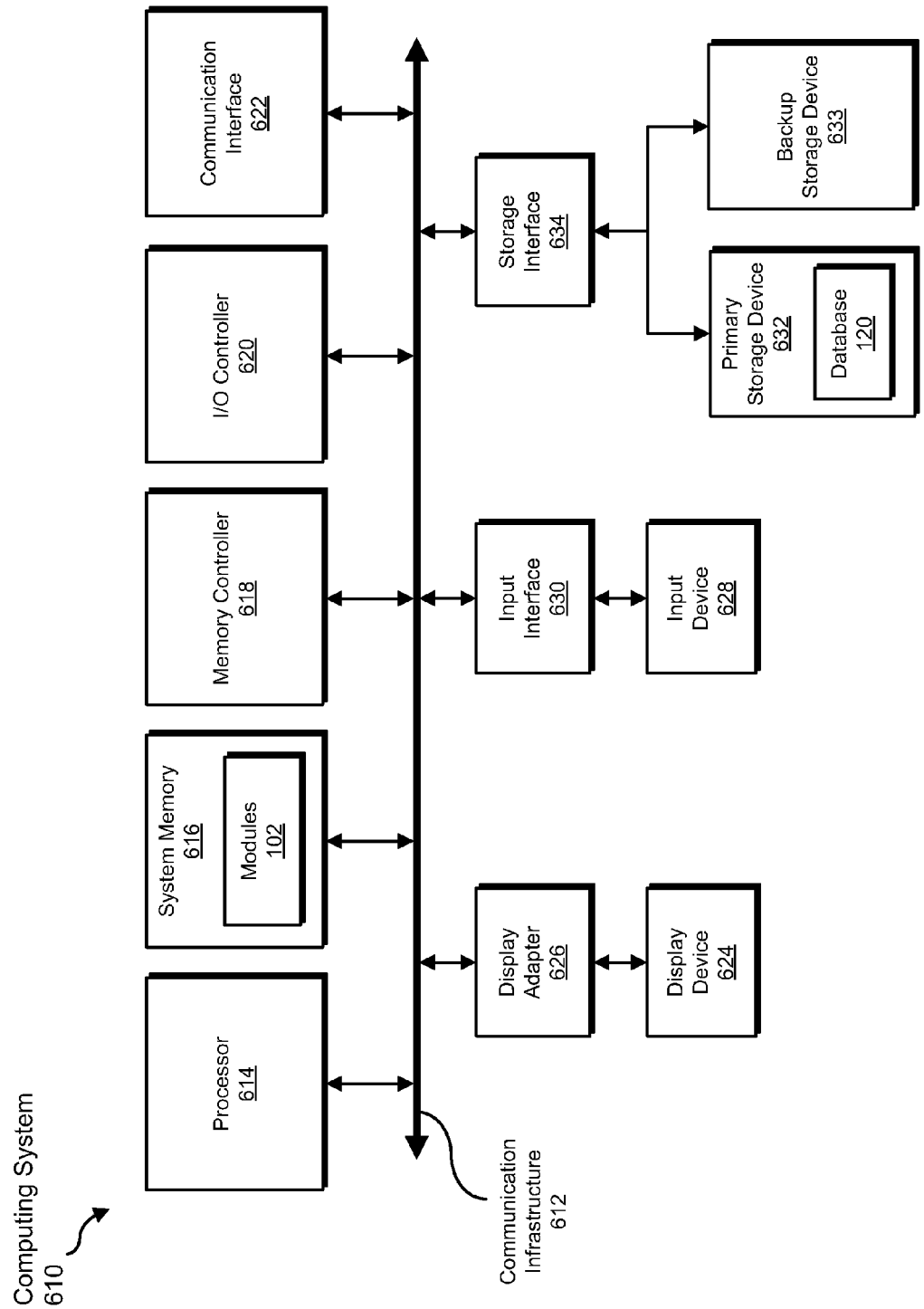
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
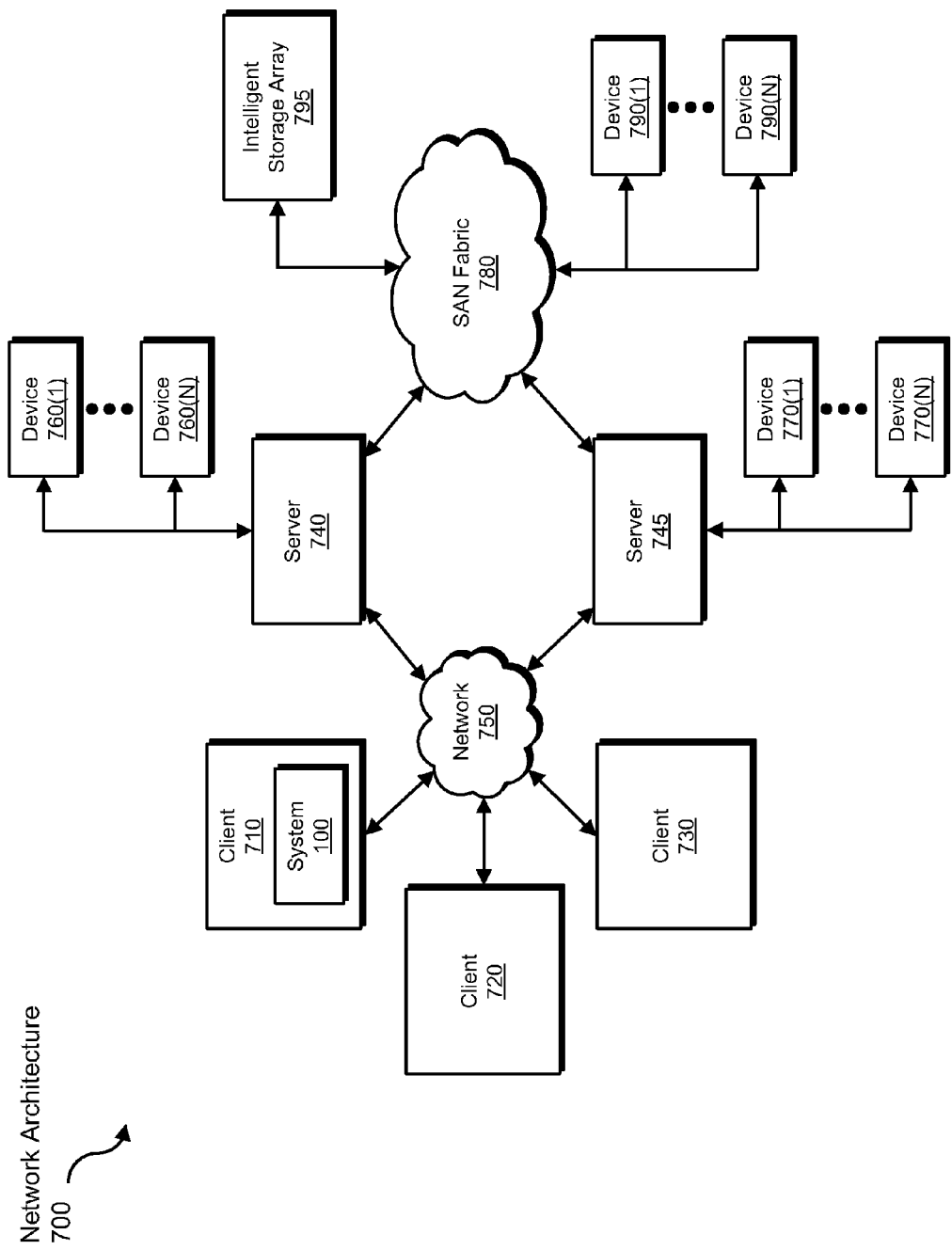
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for providing security for synchronized files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive synchronized data, security scan results, and/or requests for a security scan to be transformed, transform the synchronized data, security scan results, and/or requests for a security scan by adjusting synchronization, marking and/or categorizing data, and/or completing or answering requests, output a result of the transformation to one or more output devices or displays, use the result of the transformation to protect users from security threats, and store the result of the transformation to disk or other storage. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for providing security for synchronized files, at least a portion of the method being performed by a computing device comprising at least one physical processor coupled to a memory, the method comprising:

synchronizing, using a cloud folder synchronization service, a backend server with both a client folder on a client machine and an additional client folder on an additional client machine, the cloud folder synchronization service configured to synchronize copies of data between different locations;

propagating a file from the client folder to the backend server through the cloud folder synchronization service;

identifying, using the cloud folder synchronization service, a result of a security scan of the propagated file performed by the backend server, the result of the security scan of the propagated file indicating that the propagated file is safe such that a measured degree of maliciousness does not meet a corresponding threshold;

adjusting, using the cloud folder synchronization service, the synchronization of the propagated file with the additional client folder based on the result of the security scan at least in part by passing a skip hint, from the backend server to the additional client machine, indicating to the additional client machine to skip another security scan of the same propagated file on which the earlier security scan was performed.

2. The method of claim 1, wherein the result of the security scan is expressed as a security scan score.

3. The method of claim 1, wherein the result of the security scan is expressed as a degree of known maliciousness.

4. The method of claim 1, further comprising:
identifying, using the cloud folder synchronization service, a result of an additional security scan of an additional propagated file, the additional security scan of the additional propagated file indicating that the additional propagated file is malicious;
adjusting the synchronization of the additional propagated file with the additional client folder based on the result of the additional security scan at least in part by obstructing access from the additional client machine to the additional propagated file.

5. The method of claim 4, wherein obstructing access from the additional client machine to the additional propagated file comprises displaying a warning about the result of the additional security scan at the additional client machine.

6. The method of claim 4, wherein obstructing access from the additional client machine to the additional propagated file comprises preventing synchronization of the additional propagated file by blocking access to the additional propagated file at the additional client machine.

7. The method of claim 4, wherein obstructing access from the additional client machine to the additional propagated file comprises delaying synchronization of the additional propagated file by requiring user approval prior to synchronizing the additional propagated file with the additional client machine.

8. The method of claim 1, wherein the cloud folder synchronization service attempts to synchronize any file dropped in a client folder with at least one other client folder corresponding to the same user account.

9. The method of claim 8, wherein the cloud folder synchronization service attempts to synchronize any file dropped in a client folder with each other client folder corresponding to the same user account.

10. The method of claim 1, wherein:
the file is dropped in the client folder on the client machine;
the cloud folder synchronization service synchronizes the file dropped in the client folder on the client machine with the additional client folder on the additional client machine.

11. The method of claim 1, wherein the result of the security scan is expressed as a degree of known safety.

12. A system for providing security for synchronized files, the system comprising:
- a synchronization module, stored in a memory, that synchronizes, using a cloud folder synchronization service, a backend server with both a client folder on a client machine and an additional client folder on an additional client machine, the cloud folder synchronization service configured to synchronize copies of data between different locations;
- a propagation module, stored in the memory, that propagates a file from the client folder to the backend server through the cloud folder synchronization service;
- an identification module, stored in the memory, that identifies, using the cloud folder synchronization service, a result of a security scan of the propagated file performed by the backend server, the result of the security scan of the propagated file indicating that the propagated file is safe such that a measured degree of maliciousness does not meet a corresponding threshold;
- an adjustment module, stored in the memory, that adjusts, using the cloud folder synchronization service, the synchronization of the propagated file with the additional client folder based on the result of the security scan at least in part by passing a skip hint, from the backend server to the additional client machine, indicating to the additional client machine to skip another security scan of the same propagated file on which the earlier security scan was performed;
- at least one physical processor that is coupled to the memory and that executes the synchronization module, the propagation module, the identification module, and the adjustment module.

13. The system of claim 12, wherein the result of the security scan is expressed as a security scan score.

14. The system of claim 12, wherein the result of the security scan is expressed as a degree of known maliciousness.

15. The system of claim 12, wherein:
- the identification module identifies, using the cloud folder synchronization service, a result of an additional security scan of an additional propagated file, the additional security scan of the additional propagated file indicating that the additional propagated file is malicious;
- the adjustment module adjusts the synchronization of the additional propagated file with the additional client folder based on the result of the additional security scan at least in part by obstructing access from the additional client machine to the additional propagated file.

16. The system of claim 15, wherein the adjustment module obstructs access from the additional client machine to the additional propagated file at least in part by displaying a warning about the result of the additional security scan at the additional client machine.

17. The system of claim 15, wherein the adjustment module obstructs access from the additional client machine to the additional propagated file at least in part by preventing synchronization of the additional propagated file by blocking access to the additional propagated file at the additional client machine.

18. The system of claim 15, wherein the adjustment module obstructs access from the additional client machine to the additional propagated file at least in part by delaying synchronization of the additional propagated file by requiring user approval prior to synchronizing the additional propagated file with the additional client machine.

19. The system of claim 12, wherein the cloud folder synchronization service attempts to synchronize any file dropped in a client folder with at least one other client folder corresponding to the same user account.

20. A non-transitory computer-readable medium comprising one or more computer-executable instructions that, when executed by at least one physical processor of a computing device, cause the computing device to:
- synchronize, using a cloud folder synchronization service, a backend server with both a client folder on a client machine and an additional client folder on an additional client machine, the cloud folder synchronization service configured to synchronize copies of data between different locations;
- propagate a file from the client folder to the backend server through the cloud folder synchronization service;
- identify, using the cloud folder synchronization service, a result of a security scan of the propagated file performed by the backend server, the result of the security scan of the propagated file indicating that the propagated file is safe such that a measured degree of maliciousness does not meet a corresponding threshold;
- adjust, using the cloud folder synchronization service, the synchronization of the propagated file with the additional client folder based on the result of the security scan at least in part by passing a skip hint, from the backend server to the additional client machine, indicating to the additional client machine to skip another security scan of the same propagated file on which the earlier security scan was performed.

\* \* \* \* \*